(Model.)

G. CROMPTON.
PATTERN CHAIN BAR FOR LOOMS.

No. 244,113.  Patented July 12, 1881.

Witnesses.
Arthur Reynolds
Bernice L. Noyes

Inventor.
George Crompton
by Crosby & Gregory
Attys.

UNITED STATES PATENT OFFICE.

GEORGE CROMPTON, OF WORCESTER, MASSACHUSETTS.

PATTERN-CHAIN BAR FOR LOOMS.

SPECIFICATION forming part of Letters Patent No. 244,113, dated July 12, 1881.

Application filed March 18, 1881. (Model.)

*To all whom it may concern:*

Be it known that I, GEORGE CROMPTON, of Worcester, county of Worcester, and State of Massachusetts, have invented a new and useful Improvement in Pattern-Chain Bars for Looms, of which the following description, in connection with the accompanying drawings, is a specification.

Heretofore pattern-chains for looms have been composed of bars having round or square holes for the reception of the shanks of metal pins, the said shanks being each provided below the bar with a round or oblong central hole to receive a wire or rod passed through the said holes below the pattern-bar.

The object of my invention is to cheapen the construction of pattern-chains of this class and produce a simple, light, and efficient chain, the pins of which may be easily and quickly adjusted, the pins being provided with notches instead of holes, which very materially lessens their cost and makes them easier to use.

In the practice of my invention I take a wooden bar, provide it with a series of holes to receive the shanks of the pattern-pins, and then slot the said bar from one of its faces diagonally down into and so as to cut across the holes made in the bar, thus providing a groove which intersects the said series of holes for the reception of the pin-locking rod, which is extended along the said groove from end to end of the said bar. The pattern-pins of my bar are composed of cast metal having notches at their sides to be engaged by the locking-rod.

Figure 1:
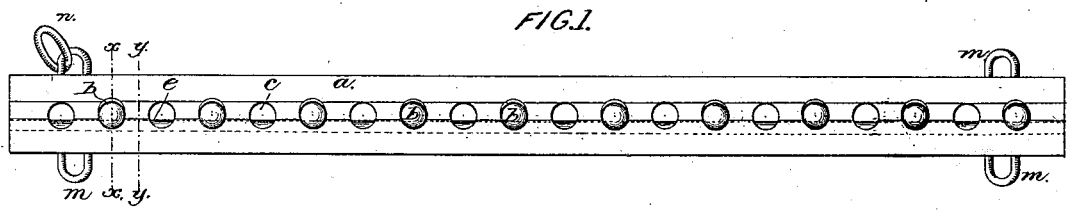
Figure 2:
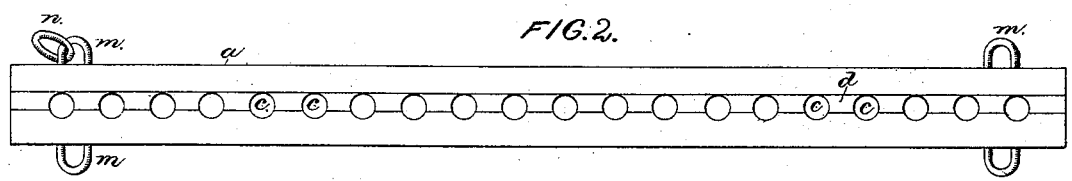
Figure 3:
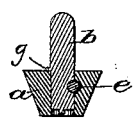
Figure 5:
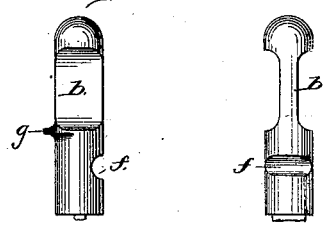
Figure 4:

Figure 1 represents, in top view, one of my improved pattern-bars with pattern-pins in place; Fig. 2, one of my improved bars with the pins removed. Fig. 3 is a section of Fig. 1 on dotted line $x\,x$. Fig. 4 is a section of Fig. 1 on the dotted line $y\,y$, and Fig. 5 shows views of a pattern-pin in different positions.

The bar $a$, composed of some hard wood, and of a depth substantially equal to the length of the shanks of the pattern-pins $b$, is provided with a series of holes, $c\,c$, of suitable size to receive the shanks of the pattern-pins. After these holes $c\,c$ are made the pattern-bar is sawed or slitted diagonally from end to end, as at $d$, to intersect the holes $c$, thus making a channel or groove for the reception of the locking-rod $e$, (see Figs. 1 and 3,) which is extended through the said groove $d$ longitudinally from end to end of the bar, and intersects the sides of the said holes $c$ and enters the notches $f$ in the shanks of the series of pattern-pins $b$, as in Fig. 3. Were it not for the groove $d$, it would be necessary to extend the shanks of the pattern-pins below the lower side of the pattern-bar and provide the shank of each pattern-pin below the bar with a round hole to receive the locking-rod $e$, and it would be necessary to make the said holes in the shanks of the pattern-pins separately.

It will be obvious to any one conversant with wood-working machinery that it would be very difficult, if not quite impossible, to bore the pattern-bars, which are small and narrow, longitudinally from end to end and provide them with one small hole to intersect all the holes $c$ for the reception of a small locking-rod $e$. Slitting the bar $a$ at $d$ enables me to readily make a proper groove for the reception of the locking-rod and yet retain the shanks of the pins in the bars, and, further, the groove $d$ being open enables me at all times, from the top of the pattern-bar, to see the end of the locking-rod as it is being moved along the groove $d$ and the pins are being adjusted and secured in place.

The operator, when adjusting the pins, always looks at the face of the bar while it rests upon the usual notched wheels for moving the pattern-chain, and need look only at the face of the bar when adjusting or re-arranging the pattern-pins; whereas if the pattern-pins were provided with round holes in their shanks extended below the under sides of the pattern-bars, it would be necessary for the operator to look under the bar for the holes in the shanks of the pins when securing them in position.

Heretofore the pattern-pins have been made of sheet metal, the shanks of the pins being punched separately with round holes, which is an expensive operation—too expensive to enable the cheap production of pattern-bars, large numbers of which are used in fancy looms.

In this my invention the pattern-pins $b$ are cast a great number at a time, and the shanks of the pattern-pins are, in the process of casting, provided at their sides with open notches $f$, which notches, when in the bar $a$, come opposite the portion of the slot $d$ intersecting the holes $c$, and form round openings corresponding with the diameter of the locking-rod $e$. The locking-rod $e$, the pins $b$ being placed in the holes $c$ of the pattern-bar, may be inserted along the groove $d$ and be readily entered into all the notches $f$ at the sides of the pattern-pins to hold them in position in the pattern-bar. A number of these bars $a$ are connected together by loops and rings $m\ n$, to thus constitute a chain of any desired length, according to the length of the pattern to be produced in the fabric.

Each pattern-pin has at one side a projection, $g$, to rest upon and prevent the pin descending too far into the bar.

I claim—

The pattern-bar $a$, provided with a series of holes, $c$, and with the slit $d$ made therein from one face of the bar to intersect the said holes $c$, combined with a series of metal pattern-pins provided with notches $f$ at their sides, and the locking-rod $e$ extended through the groove in the said bar and into the notches in the sides of the shanks of the pins, all substantially as described.

In testimony whereof I have signed my name to this specification, in the presence of two subscribing witnesses.

GEO. CROMPTON.

Witnesses:
J. HENRY HILL,
HENRY E. HILL.